United States Patent [19]

Merk

[11] Patent Number: 4,838,997
[45] Date of Patent: Jun. 13, 1989

[54] DEODORIZATION PROCESS FOR TRIGLYCERIDE OIL

[75] Inventor: Werner Merk, Buchholz, Fed. Rep. of Germany

[73] Assignee: Atlas-Danmark A/S, Denmark

[21] Appl. No.: 122,548

[22] Filed: Nov. 13, 1987

Related U.S. Application Data

[63] Continuation of Ser. No. 825,111, Feb. 3, 1986, abandoned, which is a continuation of Ser. No. 613,132, May 23, 1984, abandoned.

[30] Foreign Application Priority Data

May 25, 1983 [GB] United Kingdom ............... 8314496

[51] Int. Cl.$^4$ .......................... B01D 3/10; B01D 3/38
[52] U.S. Cl. ........................................ 203/92; 203/95; 203/DIG. 21; 202/182; 202/185.3; 202/205; 260/428
[58] Field of Search ............ 203/92, 40, 95, DIG. 21, 203/91; 202/185.3, 182, 197, 205; 260/419, 428; 426/488

[56] References Cited

U.S. PATENT DOCUMENTS

| | | | |
|---|---|---|---|
| 1,825,321 | 9/1931 | La Mont et al. | 165/147 |
| 2,042,711 | 6/1936 | Gensecke | 203/92 |
| 2,181,927 | 12/1939 | Townsend | 165/147 |
| 2,368,669 | 2/1945 | Lee et al. | 203/1 |
| 2,407,616 | 9/1946 | Phelps et al. | 203/100 |
| 2,484,788 | 10/1949 | Gunther | 203/40 |
| 3,455,975 | 7/1969 | Martinenghi | 260/428 |
| 3,506,696 | 4/1970 | Baker et al. | 260/428 |
| 3,607,670 | 9/1971 | King | 203/92 |
| 3,709,793 | 1/1973 | Bress | 203/4 |
| 3,857,866 | 12/1974 | Gibble et al. | 260/420 |
| 3,933,593 | 1/1976 | Leva | 426/488 |
| 4,089,880 | 5/1978 | Sullivan | 260/424 |
| 4,216,002 | 8/1980 | Rosenblad | 202/185.1 |
| 4,378,317 | 3/1983 | Seguine | 260/428 |
| 4,394,221 | 7/1983 | Stage et al. | 203/92 |
| 4,406,836 | 9/1983 | Miserlio | 260/419 |
| 4,599,143 | 7/1986 | Stage | 203/79 |
| 4,601,790 | 7/1986 | Stage | 159/49 |

FOREIGN PATENT DOCUMENTS

| | | | |
|---|---|---|---|
| 2526826 | 12/1976 | Fed. Rep. of Germany | 203/40 |
| 2938805 | 9/1978 | Fed. Rep. of Germany | |
| 2523465 | 9/1983 | France | |
| 0701632 | 12/1953 | United Kingdom | |
| 8909540 | 10/1962 | United Kingdom | |
| 0985719 | 3/1965 | United Kingdom | |
| 1080057 | 8/1967 | United Kingdom | |
| 2036572 | 7/1980 | United Kingdom | 426/488 |

OTHER PUBLICATIONS

Martinenghi, "Energy Swing in Oil Refining-An Improved Physical Refining System".

Primary Examiner—David L. Lacey
Assistant Examiner—V. Manoharan
Attorney, Agent, or Firm—Merchant, Gould, Smith, Edell, Welter & Schmidt

[57] ABSTRACT

Process for deodorizing triglyceride oil comprises passing dry steam through the oil, the oil being at a temperature between 160° and 280° C. and under a pressure of between 0.1 to 8.0 mbar and condensing by indirect condenser means a vapor phase having a Reynolds number less than 2300 and comprising steam, volatile materials from the oil and less than 100 mg neutral oil per m$^3$ of steam when measured under the conditions prevailing in the headspace above the oil. The condensate can be solid or liquid form. In either case the condensate can be readily removed from the condenser.

1 Claim, 2 Drawing Sheets

DEODORIZATION PROCESS FOR TRIGLYCERIDE OIL

This is a continuation of application Ser. No. 825,111, filed Feb. 3, 1986, now abandoned, which is a continuation of Ser. No. 613,132, filed May 23, 1984, now abandoned.

BACKGROUND AND SUMMARY OF THE INVENTION

The present invention relates to a process for deodorising triglyceride oil.

Traditionally deodorisation of triglyceride oil involves heating the oil under low pressure and passing through it steam which entrains objectionable volatile substances and other material. The treated oil is cooled and is available for further processing. The steam and entrained distillation vapors are condensed and either disposed of or valuable materials extracted from the distillate prior to disposal. Conventionally condensation occurs by direct contact with water. To effect condensation and removal of distillate from the condenser large amounts of water are required which can cause problems in disposing of the effluent formed.

One approach to overcome the effluent disposal problem is to use indirect surface condensers. However, their use in the past has on the whole been deliberately avoided as the condensate of water and entrained materials is well known to form an intractable emulsion which not only proved very difficult to clean from the condenser surface, but as it built up also steadily reduced the efficacy of the condenser. One attempt to provide a process involving the use of a surface condenser which allegedly avoided the problems associated with the condensate emulsion is described in DE-A-29 38 805 which teaches condensing the steam and entrained materials at a temperature above 30° C. and relatively high pressures requiring higher energy input. An alternative approach to the problem is advocated in GB- A-1 080 057 which employs an indirect freezer condenser operating at a temperature between −20° and −40° C. so that the condensate forms in the solid phase. In practice however we have found that in use each of these processes as described gives rise to one or more problems.

According to the present invention there is provided a process for deodorising a triglyceride oil comprising passing dry steam through the oil, the oil being at a temperature between 160° C. and 280° C. and under a pressure of between 0.1 to 8.0 mbar and condensing by indirect condenser means a vapor phase having a Reynolds number below 2300 and comprising steam, volatile materials from the oil and less than 100 mg neutral oil per m³ of steam when measured under the conditions prevailing in the headspace above the oil.

We have discovered that the combination of the use of dry steam, low headspace pressures in the range 0.1 to 8.0 mbar, preferably 0.1 to 4.0 mbar, more preferably 0.5 to 2.0 mbar, and the indirect condensation of a vapor phase having the stated Reynolds number and containing less than 100 mg, preferably less than 10 mg, neutral oil per m³ of steam when measured under the stated conditions yields a condensate which can be readily removed from the condenser surfaces. In particular, we have found that the formations of emulsions can be avoided.

By "dry" steam we mean a steam in which the equilibrium vapor pressure of pure water is more than the pressure under which the steam is maintained prior to passage through the oil.

As the steam passes through the oil it not only volatilises, as desired, volatile materials, but it can also entrain droplets of neutral oil. Preferably the oil is at a temperature between 180° and 270° C. The stated content of oil required in the vapor to be condensed can be achieved in a number of ways. For example the low oil content can be achieved by separating entrained oil droplets from the vapor, for example, by employing a demister and/or a pre-condenser. The pre-condenser is suitably a conventional vapor scrubber or water cooled heat exchanger and is arranged to operate in the temperature range of 20° to 150° C., preferably 40° to 70° C. so as in addition to condense free fatty acids in the vapor. Alternatively, or as well as, the velocity and pressure of steam can be controlled so that the amount of entrained oil in the vapor phase is reduced. To achieve a content of less than 10 mg oil per m³ steam of entrained oil, as measured in the headspace above the oil, the velocity of the steam ($m_s/A$) is controlled to between about 1.7 and 16.0 kg per hour and square meter cross-sectional area of headspace of the deodoriser chamber. The actual velocity selected will depend on the headspace pressure according to the formula:

$$m_s/A \leq 5.5\sqrt{P}$$

where $m_s$ = mass of steam per time unit (kg/h)
P = head space pressure (mbar)
A = cross sectional area deodoriser (m²)

In practice a combination of means to separate entrained oil droplets and attention to steam velocity is preferably employed so that steam velocities in excess of 16.0 kg/hr can be employed per m² cross-sectional area of headspace of deodoriser. Preferred steam velocities can be up to a factor of 4 higher than that given by the above equation and can thus lie between 16.8 and 64 kg/(hm²). The particular procedure selected in any case will depend on the system employed. For example higher pressures between 4.00 and 8.00 mbar can be employed with a packed column deodoriser. In use the present process can employ a vapor phase having a neutral oil content down to 0.01 mg per m³ steam when measured under the conditions prevailing in the headspace above the oil.

The vapor phase can either be condensed to a liquid phase or a solid phase. In the former case the pressure of the vapor phase is preferably increased to above 10 mbar, but suitably from an economic point of view not more than about 60 mbar prior to entry into the condenser which is preferably operated at a temperature between 0° C. and 25° C. and can be cooled by any suitable medium for example water. To increase the pressure of the vapor phase a mechanical pump is preferably employed. A mechanical pump is preferred over a conventional steam booster as it imparts less energy to the vapor and hence lessens the risk that an emulsion may form. To condense the vapor phase directly to the solid phase a pressure of 0.1 to 8.0 mbar, preferably 0.1 to 4.0 mbar and more preferably 0.5 to 2.0 mbar is suitably maintained in the condenser which is suitably operated at a temperature between −20° and −50° C. Suitable refrigerants include $NH_3$ and Freons.

In order to achieve a preferred rate of condensation of condensate in the condenser means the flow path through the condenser means preferably has a cross-sectional area which at least in part decreases in the direction of flow of the vapor phase. The decrease in cross-sectional area of the flow path is preferably arranged so that the flow rate of the vapor phase through the condenser means is maintained substantially constant with respect to the cross-sectional area of the flow path. For any one case the flow path is thus preferably arranged such that the Reynolds number of the vapor entering the flow path is substantially equal to the Reynolds number of the vapor phase leaving the flow path. Suitably the decrease is such that the ratio of the cross-sectional area of the inlet to the flow path to the cross-sectional area of the outlet to the flow path lies within the range of between 50:1 and 5:1. The decrease is preferably due to the deposition of condensate as the vapor phase passes along the flow path. Due to this decrease deposition of each of the components of the vapor phase having condensation requirements with the temperature and pressure conditions of the flow path can be achieved such that the sole effluent from the flow path can be reduced to residual air and moisture only. It can thus be possible to arrange for the effluent composition to be suitable for direct release into the atmosphere. The condenser means can be in one or more parts, for example it may be convenient to arrange the condenser means so that between 60 and 85 wt % of the vapor phase condenses in a part with a relatively wide flow path and the remainder of the condensable material in the vapor phase condenses in a part with a relatively narrow flow path.

Advantageously where a pre-condenser is employed it can have a flow path whose cross-sectional area decreases in the direction of vapor flow. The degree of decrease is preferably arranged to maintain the ratio of condensable to non-condensable material in the pre-condenser substantially constant. Such an arrangement can be particularly advantageous where a large amount of fatty acids are removed, for example, during distillative neutralisation and/or a headspace at the upper end of the stated range is employed, for example when using a packed column deodoriser.

Solid condensate from the condenser can be removed by adjusting the temperature and/or pressure conditions. Preferably the adjustment is such to liquidise the solid condensate which can then be drained from the condenser. The adjustment preferably comprises admitting air at atmospheric pressure to the flow path. Collection and separation of the condensate into two or more portions may be performed to separate for example useful tocopherols from the remainder of the mixture.

Whether the condensate is collected in liquid or solid form, the flow path through the condenser is preferably tortuous. Increased heat and mass transfer and hence deposition of condensate can thus be obtained. Laminar flow (i.e. Reynolds number <2300) is, however, maintained throughout the flow path. Preferably the Reynolds number of the vapor phase in the flow path is below 1000 and above 10. The flow path is preferably defined by, inter alia, tubular members of the condenser carrying the cooling medium. The tubular members are preferably finned and can be separated by one or more baffles.

The present process can be operated as a batch process, a semi-continuous process or a continuous process.

Where the condensate is in liquid form it can be continuously drained from the condenser. As in the case of a solid condensate the collected condensate can be separated into two or more portions to separate, for example, useful tocopherols from the remainder of the condensate mixture. We have found that the present condensate whether collected in liquid or solid form readily allows separation into two or more portions or phases.

When operating a batch process the adjustment of the condenser to liquidate solid condensate can conveniently take place whilst treated oil is being emptied from and/or further oil being filled into the batch vessel. In such an arrangement only one condenser need thus be required. Such an arrangement is advantageous in that only valve means need be provided to separate the condenser from the batch vessel, but no junction point is necessary at the inlet to the condenser. When operating a continuous or semi-continuous process with solid condensate collection more than one condenser is preferably present. Valve means to vary the condenser in use is preferably installed so that the condenser in use can be altered to allow intermittent removal of the solid condensate from any other condenser present.

According to a second aspect of the present invention there is provided apparatus for deodorising a triglyceride oil comprising heating means to heat in use oil to a temperature between 160° and 280° C., means for maintaining in use a pressure above the oil of between 0.1 and 8.0 mbar, preferably between 0.1 and 4.0 mbar, more preferably between 0.5 and 2.0 mbar, means for passing in use dry steam through the oil and indirect condenser means having a flow path arranged to receive a vapor phase having a Reynolds number less than 2300 and comprising steam, volatile materials from the oil and less than 100 mg neutral oil per $m^3$ of steam when measured under the conditions prevailing in the headspace above the oil.

Preferably the flow path has at least in part a cross-sectional area which decreases in the direction of flow of the vapor phase.

The rate of decrease of the cross-sectional area of the flow path is preferably such that the ratio of the cross-sectional area of the inlet to the cross-sectional area of the outlet to the flow path lies within the range of from 50:1 to 5:1. The rate of decrease selected in any one case will be determined inter alia by the ratio of condensable to non-condensable material in the vapor phase and heat and mass transfer characteristics of the vapor phase. Suitably the decrease is such that the Reynolds number of the vapor phase at the inlet is substantially equal to the Reynolds number of the vapor phase at the outlet.

The temperature and pressure conditions in the flow path of the condenser means are selected appropriately. Preferably the condenser means is adapted to maintain in use conditions of pressure and temperature in the flow path of between 0.1 and 8.0 mbar, preferably between 0.1 and 4.0 mbar, more preferably 0.5 and 2.0 mbar, and between −50° and −20° C. Such ambient temperature in the flow path can be provided by any suitable refrigerant such as for example ammonia, fluorocarbons and chlorocarbons. In the case of flow path conditions arranged to achieve solid condensate pump means to provide the necessary vacuum conditions are suitably located after the condenser means. Any pump means can be employed provided it provides the required pressure. An example of a suitable pump means is a rotary vane pump.

Preferably the condenser means is adapted to maintain pressure and temperature conditions in the flow path of between 10 mbar and 60 mbar and 0° C. and 25° C. Suitable cooling agent is water. Suitable pump means for example a mechanical pump, is located before the condenser means.

Preferably the flow path is tortuous. The tortuosity is preferably provided by tubular members of the condenser which are preferably finned. Baffles may also be provided in the condenser.

Preferably the apparatus includes a second condenser means adapted for, in use, passage of the vapor phase therethrough prior to passage through the first said condenser means, the second condenser means being for, in use, condensation of fatty acids in liquid form. The second condenser means can for example be a conventional vapor scrubber or water cooled heat exchanger. If required a demister can be included in the apparatus.

Preferably, the apparatus includes valve means adapted to close the entrance to the flow path. Additionally the apparatus preferably includes means adapted to adjust the ambient temperature and/or pressure in the flow path so as in use to liquidise solid condensate and remove it. The apparatus can moreover include means to separate into one or more portions condensate formed in the first condenser means.

If desired the apparatus can include a plurality of the first said condenser means and means to direct, in use, the vapor phase to any one of the said plurality. Variation of the first condenser means in use can thus allow removal of the solid condensate from one condenser means without the necessity to close down the treatment process.

The present invention is applicable to the treatment of any triglyceride oil which requires deodorisation treatment, optionally in combination with distillative deacidification. Examples of such oils are soybean oil, sunflower oil, palm oil, rapeseed oil, coconut oil, fish oil tallow, mixtures and fractions thereof. Particularly coconut oil and soybean oil can be subjected to distillative deacidification by the present process and apparatus.

It it to be understood that the present invention extends to the products of the present process and to oils treated by the present apparatus.

BRIEF DESCRIPTION OF DRAWINGS

An embodiment of the present invention by way of example only will now be described with reference to the accompanying drawings; wherein.

DETAILED DESCRIPTION

Figure 1:
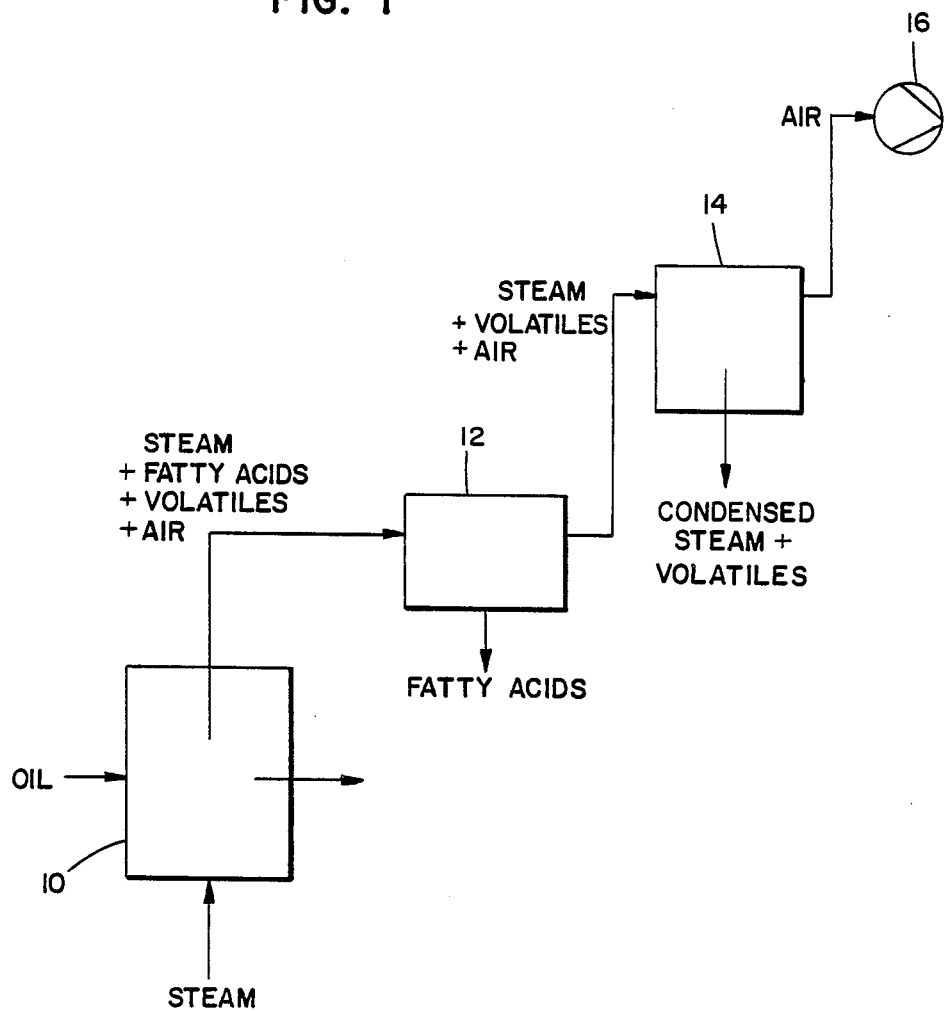
FIG. 1 shows in diagrammatic form a form of apparatus embodying the present invention.

Referring firstly to FIG. 1 the apparatus includes a deodoriser chamber 10 having an inlet for steam and an outlet for volatile materials. Exit and entry means are also provided for oil. The outlet leads to a vapor cooler 12 which in the present embodiment is a vapor scrubber. An outlet from the vapor cooler 12 leads to the condenser 14. An outlet from the condenser 14 leads to a vacuum pump 16 which in use is able to produce a pressure of from 0.5 to 2 mbar throughout the apparatus. The vacuum pump is a mechanical rotary vane pump.

Figure 3:
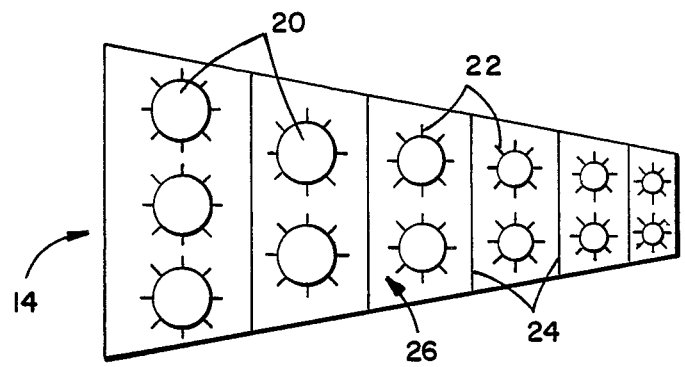
FIG. 3 is a horizontal cross-section along the line 3—3 in FIG. 2.
Figure 2:
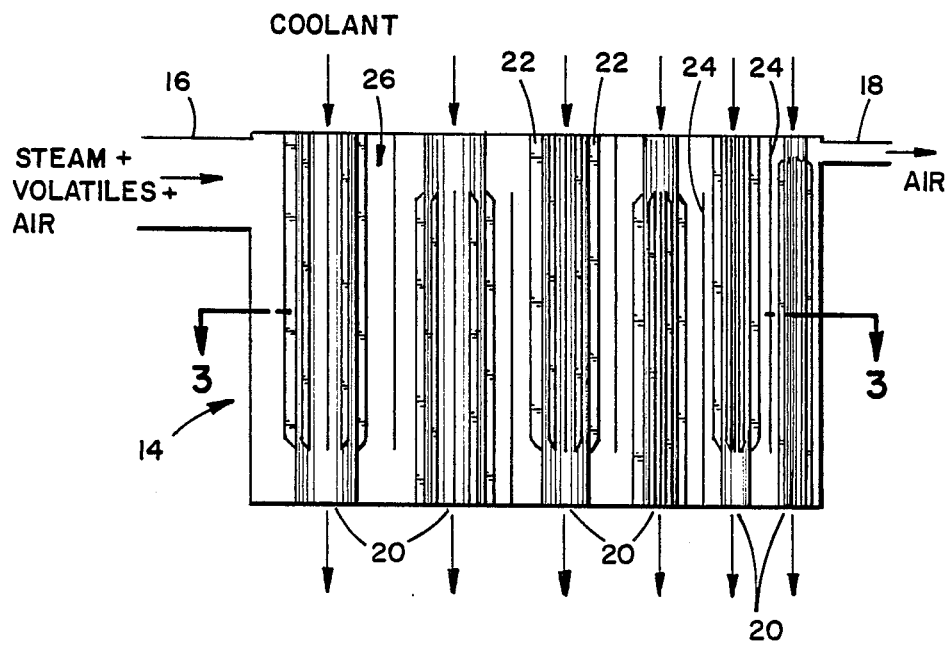
FIG. 2 is a vertical elevation view of the inside of condenser 14, of FIG. 1.

The interior construction of the condenser 14 is described with reference to FIGS. 2 and 3. The condenser 14 has at one lateral end face an inlet 16 and at an opposite and narrower lateral end face an outlet 18. Between the inlet 16 and the outlet 18 are arranged a plurality of tubes 20 extending the height of the condenser 14 and arranged in rows transverse to the two said end faces. Each of the tubes 20 is finned longitudinally. The arrangement of the rows of the tubes and of the finning on the tubes is chosen so as to achieve laminar flow conditions. Each tube carries a heat exchange medium which, depending on use is liquid ammonia or water. With respect to each row of tubes 20 the fins 22 extend alternately from the ceiling and the floor of the condenser 14, in each case stopping short of the floor and ceiling respectively as shown in FIG. 2. Each row of tubes 20 is separated from its neighbour or neighbours by respective fixed vertical baffles 24 which extend alternately from the ceiling and the floor and, as shown in FIG. 2, stop short of the floor and ceiling respectively. The finned tubes 20 and the baffles 24 thus define a tortuous path 26 from the inlet 16 to the outlet 18.

The cross sectional diameter of the tubes 20 and the spacing between adjacent tubes and between neighboring rows decreases on passing from the inlet 16 to the outlet 18. Suitably the spacing between nearest points of adjacent finned tubes at the inlet end of the flow path is about 100 mm and between adjacent tubes at the outlet end of the flow path about 10 mm or as close as possible. The dimensions of the end faces, tube spacings and dimensions are selected so that the cross sectional area of the tortuous flow path 26 decreases on passing from the inlet 16 to the outlet 18. The ratio of the cross sectional area of the inlet to the cross-sectional area of the outlet of the flow path is 20:1. The change in cross-sectional area is selected so that the heat transfer co-efficient between the medium passing through the condenser and the surface of the finned tubes 20 remains substantially uniform as material is condensed in the condenser, i.e. so that the Reynolds number of the vapor phase at the inlet is substantially equal to the Reynolds number of the vapor phase at the outlet.

In operation the deodoriser chamber 10 is filled with oil to be treated. The chamber is evacuated to 0.5 to 2.0 mbar and the oil heated to the desired temperature. Super-heated steam is fed into the oil. The resulting vapor phase having a pressure of from 0.5 to 2.0 mbar and comprising steam, volatile materials entrained by the steam on its passage through the oil passes to the vapor cooler 12 which is maintained at a temperature between 50° and 60° C. In the vapor cooler fatty acids and other components of similar low volatility contained in the vapor phase condense to a liquid. The remaining vapor phase passes to condenser 14 and enters the flow path 26. The condenser, when using ammonia, is maintained at a temperature of between −50° and −20° C. The pump maintains a pressure throughout the apparatus including the condenser within the range of from 0.5 to 2.0 mbar. The sole effluent to the atmosphere comprises air, arising from unavoidable leaks into the apparatus, and a small amount of moisture.

In an alternative embodiment the vapor cooler 12 is omitted. In operation the vapor phase comprising steam, volatile materials passed directly from the deodoriser chamber 10 to the condenser 14.

Examples of use of the alternative embodiment of apparatus with the vapor cooler 12 omitted will now be described:

EXAMPLES 1 to 12

Examples 1 to 12 were performed with the following oils:
1. A mixture of neutralised and bleached soybean oil and hardened soybean oil having an overall free fatty acid content of about 0.1 wt %.
2. Distillative neutralisation of soybean oil
3. Neutralised and bleached rapeseed oil
4. Distillative neutralisation of rapeseed oil containing 0.87 wt % free fatty acid
5. Neutralised and bleached sunflower oil
6. Distillative neutralisation of sunflower oil
7. Palm oil
8. Palm olein
9. Fish oil
10. Tallow olein
11. Neutralised and bleached coconut oil
12. Distillative neutralisation of crude coconut oil containing 2.1 wt % free fatty acid A 300 kg batch of oil was placed in the deodoriser chamber 10. Temperature and pressure conditions prevailing in the chamber 10 were adjusted to between 190° and 240° C. and 1.0 to 1.5 mbar respectively. Dry steam at a constant flow rate with $m_s$ between 1.2 and 2.0 kg/h was fed to the deodoriser chamber. The resulting vapor phase was led through the condenser 14. In the condenser 14 the vapor phase was maintained at a pressure of 1.0 mbar or less and a temperature of $-30°$ C. with a cooling medium of the condenser 14 at a temperature between $-40°$ and $-50°$ C. In the condenser 14 the Reynolds number of the vapor phase lay between 400 and 600.

On completion of the deodorisation air was admitted to the condenser 14 and the condenser was indirectly heated to 60° C. At 60° C. the solid deposits formed were liquid which in each case readily drained from the condenser. The liquid was a two phase mixture. It was not however in the form of an emulsion. On average at least 95 wt % of the steam injected into the oil was recovered as water in the condenser 14. The oily phase of the condensate included, depending on the oil, a mixture of, inter alia, tocopherols and free fatty acids. A free draining liquid was obtained on heating, however, even in the case of distillative neutralisation such as Example 12 in which the condensates contained 6.4 kg free fatty acid. In each case the neutral oil loss was less than 30 g which represented a neutral oil content in the vapor phase when measured under the conditions prevailing in the headspace in the deodoriser chamber above the oil of less than 10 mg per m³ steam.

Comparative Examples A & B

A. Bleached but unneutralised soybean oil was subjected to distillative neutralisation under the above conditions but with the exception that wet steam was employed. 2 kg of condensate was formed in condenser 14. On heating the condenser 14 the condensate was found to be in the form of an emulsion which was difficult to remove from condenser 14.

B. The same oil and conditions were employed as in Comparative Example A with the exception that dry steam was employed but at a throughput rate of 6 kg/h. The high flow rate increased the neutral oil content to about 800 g/h which gave rise to a neutral oil content in the vapor phase entering the condenser 14 of about 120 mg per m³ steam as measured under the conditions prevailing in the headspace of the deodoriser chamber 10. On heating the condenser 14 the condensate was found to be in the form of an emulsion which could not be readily removed from the condenser 14.

EXAMPLE 13

The present example illustrates the use of the present process and apparatus to form a liquid condensate direct. Using an embodiment in which the vapor cooler is omitted and a mechanical vacuum pump is located intermediate the deodoriser chamber 10 and condenser 14, 300 kg of neutralised and bleached soybean oil are deodorised at a temperature of 240° C. and a pressure of 2.0 mbar dry steam being passed through the chamber 10 at a constant rate of 2.0 kg/h. The resulting phase is fed through the mechanical pump to increase the pressure to 42 mbar. The vapor phase has a Reynolds number of about 500 and is led into the condenser 14 which is cooled with water at a temperature of about 20° C. The liquid condensate comprising a mixture of water and fatty material not in the form of the emulsion could be readily pumped away. The neutral oil content in the vapor phase is less than 10 mg per m³ steam as measured in the conditions in the deodoriser chamber headspace.

I claim:
1. A process for deodorizing a triglyceride oil to produce a condensate without undesirable emulsions, comprising the steps of:
    (a) heating the oil in a chamber to a temperature of about 160°–280° C. under a headspace pressure of about 0.1–8.0 mbar;
    (b) passing dry steam through the heated oil to form a vapor including steam, volatile materials, and oil; wherein said dry steam comprises steam in which the equilibrium vapor pressure of water is more than the pressure under which the steam is maintained prior to passage through the oil, and wherein the velocity of the steam is between about 1.7 and 16.0 kg/hr per m² cross-sectional area of headspace above the oil;
    (c) maintaining the oil content in the vapor to about 0.01–100 mg/m³;
    (d) increasing the pressure of the vapor to above about 10 mbar by mechanical pump means;
    (e) directing the pressurized vapor into the inlet of an indirect condenser;
    (f) passing the vapor through the indirect condenser along a flow path of decreasing cross-sectional area at a pressure less than about 60 mbar and at a substantially constant flow rate having a Reynolds number less than about 2300; wherein the decrease is such that the ratio of the cross-sectional area of the inlet to the outlet of the indirect condenser is between about 50:1 and 5:1;
    (g) indirectly condensating the vapor by passing coolant at a temperature of about 0°–25° C. along another separate flow path through the indirect condenser;
    (h) collecting the resultant condensate from the indirect condenser; and
    (i) exhausting the remaining vapor from the outlet of the indirect condenser.

* * * * *